May 1, 1962
C. C. CARTER
3,032,121
APPARATUS FOR THINNING GROWING ROW CROPS
Filed Nov. 16, 1959
3 Sheets-Sheet 1
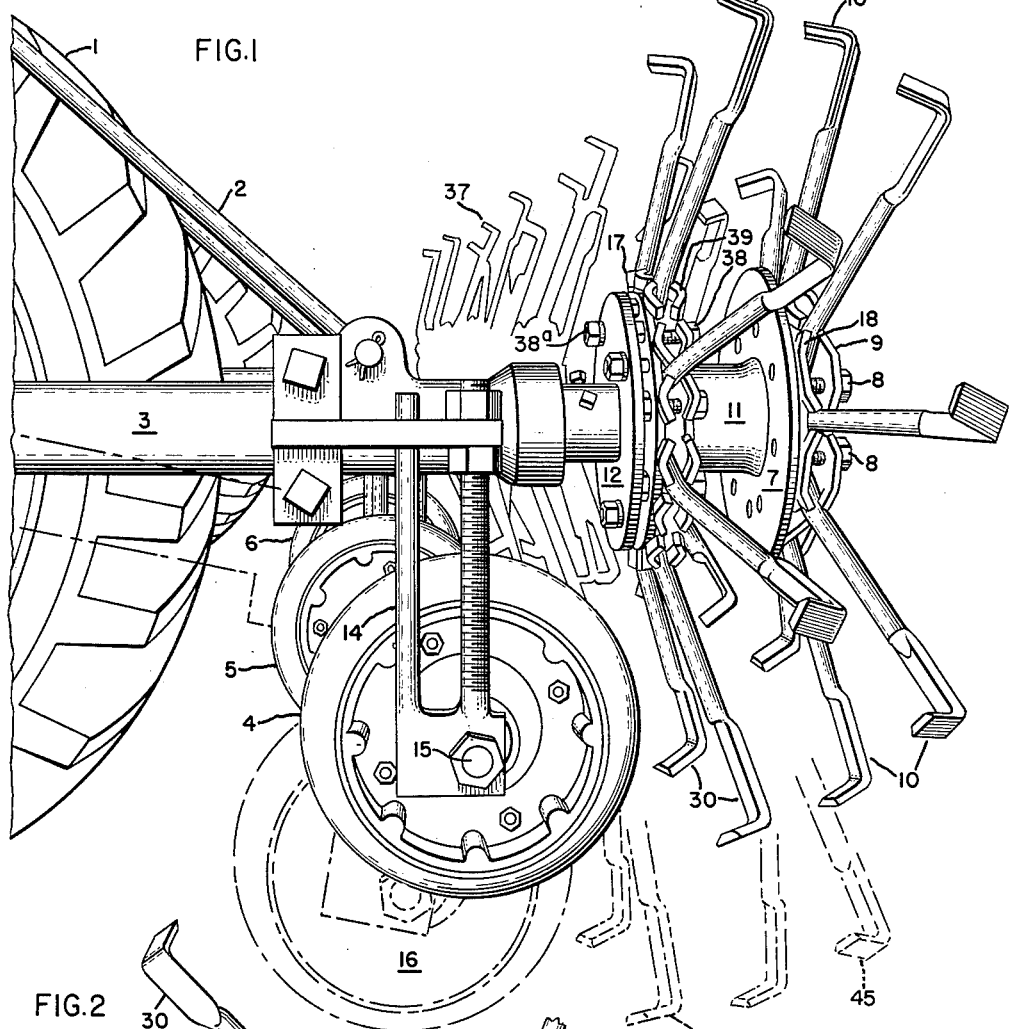
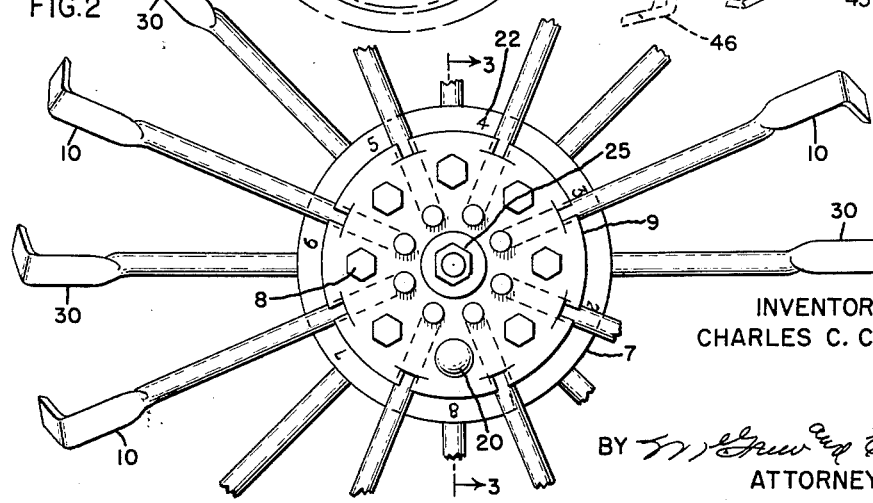
INVENTOR:
CHARLES C. CARTER,
BY *McGrew and Edwards*
ATTORNEYS

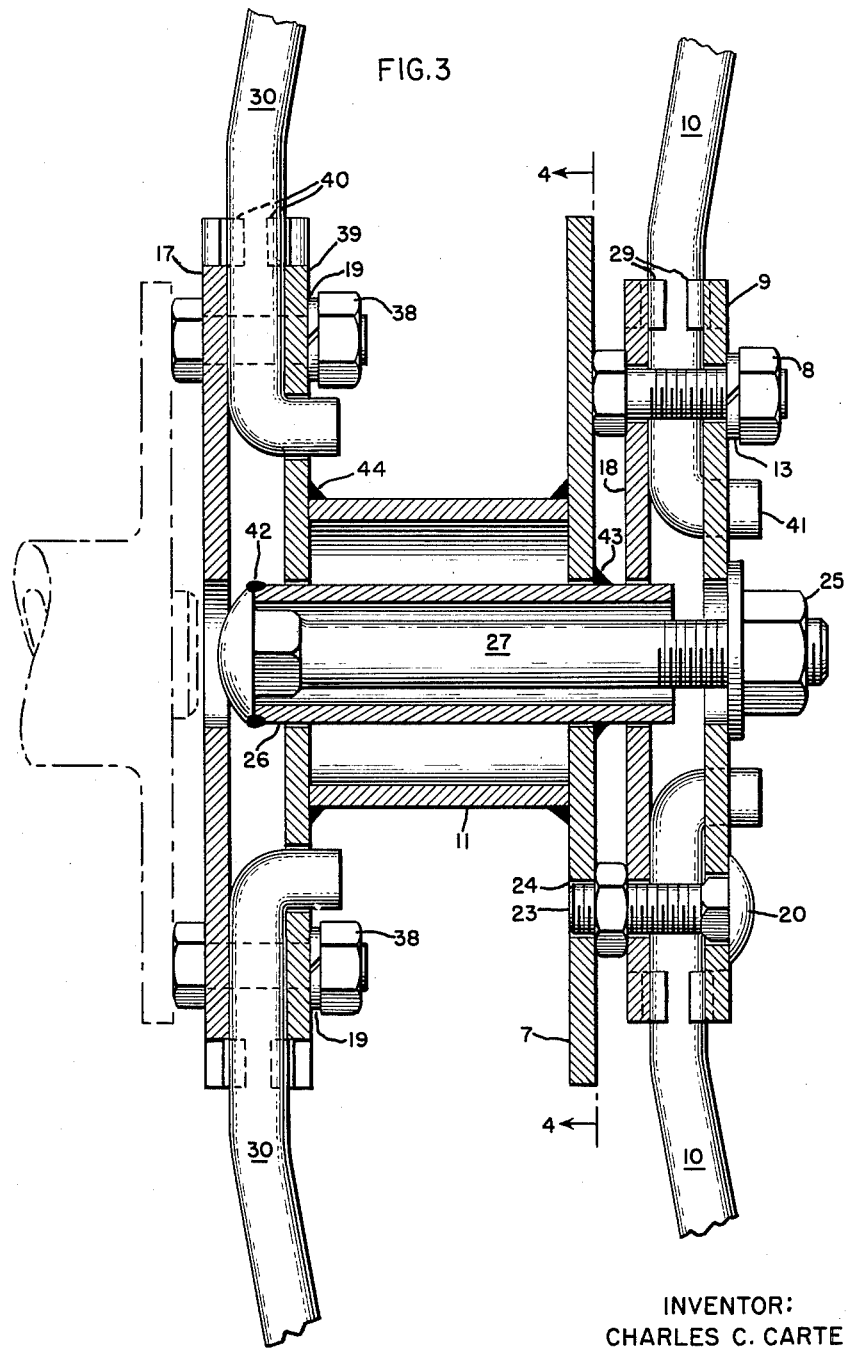

DIAGRAM SHOWING CUT SPACING ON ROW

INVENTOR:
CHARLES C. CARTER,

BY *McGrew and Edwards*
ATTORNEYS

United States Patent Office 3,032,121
Patented May 1, 1962

3,032,121
APPARATUS FOR THINNING GROWING
ROW CROPS
Charles C. Carter, Westminster, Colo., assignor to Silver
Corporation, Denver, Colo., a corporation of Colorado
Filed Nov. 16, 1959, Ser. No. 853,289
10 Claims. (Cl. 172—58)

My invention relates to an improved agricultural implement and more particularly to apparatus by which thinning, blocking and cultivation of growing crops may be accomplished in an efficient and desirable manner.

One area of constant concern to the farmer in row crop planting is proper weed and stand control. Stand control is control of the density or number of plants growing per given unit of area. Factors of soil richness, water, type of crop and other considerations all enter into the computation of the most desirable plant density per given unit area. After the seeds have germinated in a planted row and true seedlings appear, there arises the necessity of eliminating a number of the seedlings because of undesirable closeness. This elimination is necessary in order that proper growth may be accomplished by the largest number of plants.

In the past, stand control and weed elimination have been accomplished manually and by mechanical apparatus. One rule of thumb method by which stand control has been accomplished is by "half-way" elimination, i.e., if the seeding accomplished one plant every three inches, one plant will be eliminated every six inches, thus accomplishing a spacing of one plant every six inches. Later, it may be desirable to eliminate one plant every twelve inches, thus accomplishing a spacing of one plant every twelve inches. The eventual selection of spacing is dependent upon the character and relative success of a given seeding.

For example, in growing sugar beets, an attempt is made to obtain a maximum tonnage of beets per acre with maximum sugar content. By properly controlling the density of the beet stand, the farmer may encourage the large growth dimensions of retained beets by properly eliminating some of the intermediate plants. In prior art practices, it has been necessary to laboriously remove the intermediate undesirable plants by hand or by apparatus having knives or similar digging and/or cutting devices fixed on suitable machinery for eliminating the undesirable intermediate plants according to a constant cutting pattern.

One of the prior art devices for accomplishing such mechanical elimination has been a series of fixed, evenly spaced knives extending from the outside diameter of a circular plate or head, which was driven by a suitable power source. If it was desired to eliminate more plants, or to accomplish elimination in a shorter interval, two plates would be fastened together in such manner that the knives of the second plate bisected the angles between the knives of the first plate. However, the result accomplished was merely different spacing of cuts in a given row without any variation in the width of the cut, i.e., it was possible to accomplish an increased number of cuts but this arrangement could not change the length of a cut along the row. Furthermore, the doubling of the plates and knives placed the latter in such close proximity as to tear the foilage and disturb root systems of the plants with resulting growth loss.

My invention provides a solution to these problems and results in a quick, efficient and time saving arrangement by which the farmer may selectively vary the relationship between cuts to eliminate plants; provides the farmer with apparatus by which it is possible to vary the spacing of the cuts while at the same time varying the width of each cut; and further provides the farmer with apparatus by which the spacing relationship between blades of one head and the blades of an adjoining head may be varied according to a predetermined but not uniform relationship.

Therefore, it is an object of this invention to provide simple, durable and efficient apparatus which may be used for thinning, blocking and weeding crops according to selective cutting patterns.

It is another object of my invention to provide such apparatus by which the spacing relationship between cutting blades may be varied according to a predetermined but not uniform relationship.

It is a further object of this invention to provide a simple, durable and efficient apparatus by which it is possible to vary the width of cuts made between plants in a row.

Further objects and advantages accomplished by the instant invention will become obvious from a study of the following description with reference to the appended drawings. Referring to the drawings which illustrate one manner of practicing my invention:

FIG. 1 is a perspective view of the wheel-supported cutters of the instant invention in their elevated or inoperative positions;

FIG. 2 is a rear elevational view of cutter heads of the instant invention;

FIG. 3 is an enlarged elevation-sectional view of the cutter of FIG. 2 taken along the section 3;

Figure 4:
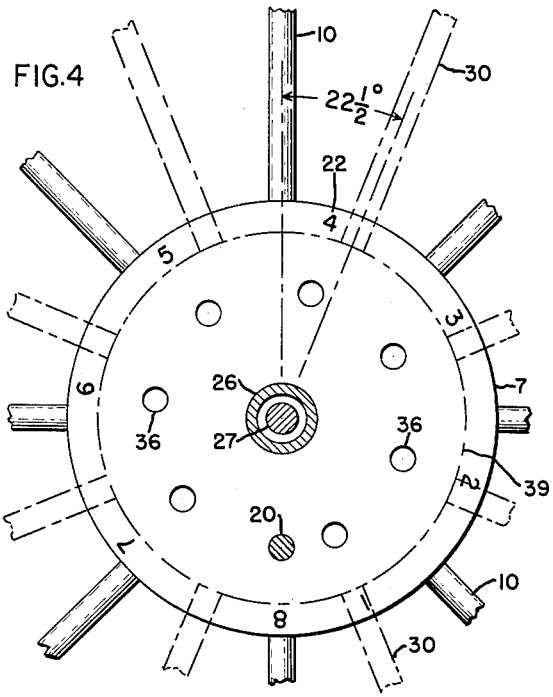
FIG. 4 is a view of the indexing plate of the instant invention along the section 4 of FIG. 3.

Referring now more specifically to the appended drawings which are indicative of a mode of using my invention, the apparatus comprising my invention is shown to be carried by a suitable wheeled vehicle having driving wheels 1. Suitable support means 2 are instrumental in supporting a drive shaft 3 in an elevated and inoperative position, such as when moving the apparatus of my invention to an area to be thinned. The drive shaft 3 projects rearwardly from the axle (not shown) carrying the said drive wheels 1 and has suitably carried thereon operating wheels 4, 5 and 6 supported through axle 15 by suitable supports 14 which are adjustably carried by said drive shaft 3 at a point intermediate the ends thereof. Rearwardly of said support means 14 is plate 12. Suitably attached to plate 12 by bolts 38ª are locking plates 17 and 39 having contained therebetween radially disposed cutting elements or knives 30, such that a substantially circumferential cutter pattern is obtained. Rearwardly of aforesaid mentioned plate 12 carrying knives 30, is extension 11 of drive shaft 3 having contained thereon plate element 7 having suitably attached thereto locking plates 18 and 9 having disposed in locked relationship therebetween knives or cutting elements 10. The combination of locking plates and bolts holding the said plates together with the knives circumferentially positioned therebetween is referred to as a thinning knife head or simply a knife carrying head.

Further referring to FIG. 1, it will be noted that the structure hereinbefore referred to, wheels 4, 5 and 6 and cutting blades 10 and 30, are shown in dotted lines as they would be in operating relationship to rows of crop to be thinned, i.e., the wheel 4 is shown as element 16 in dotted lines and the cutting knives 10 and 30 are indicated by the reference characters 45 and 46, respectively, as they would be in their operative position. It should be noted that a plurality of heads similar to those discussed above may be carried on the same tractor as indicated by reference character 37. All the heads will be driven from a common power source, i.e., the tractor or other farm machine.

Referring now to FIG. 2, there is shown a rear elevational view of the cutter or knife head with similar numerals referring to like parts with respect to FIG. 1. It will be noted that the plate 7 has numerals 22 spaced at predetermined intervals around its outside perimeter. The outer locking plate 9 and the locking plate 18 are shown in fixed relation to plate 7 having locked therein cutting elements or knives 10. The plates 9, 18 and 7 are shown to be locked by bolt 25. Element 20, which will be referred to in greater detail with reference to FIG. 3, is a centering or keying lug.

Referring now to FIG. 3, there is shown an enlarged side elevational-sectional view of the cutting heads shown in FIG. 1. Further referring to FIG. 3, the cutting or thinning elements 30 and 10 are held to the locking plates 17 and 39, and 18 and 9, respectively, by sets of T means 40 and 29, respectively. The plates 17 and 39, 18 and 9, have a pair of teeing members such as 40 and 29 for each of the knives attached. Referring more specifically to cutting elements or knives 10, the T element 29, and the opposing T element carried by plate 9, lock the shaft of knife 10 in place by the pressure of nut 8 carried on lock washer 13. The lower end of knife 10, indicated by reference character 41, passes through an opening in the plate 9. The knives 30 are similarly attached to the plates 17 and 39 and held in place by bolt 38 on lock washer 19. The extension of drive shaft 3, identified by reference character 11, is a hollow member having disposed therein another tubular member 26 which contains the shaft 27 carrying nut 25 which serves to hold the outer cutting head containing knives 10 in place. Welds such as 42, 43 and 44 serve to anchor the shaft 27 in place. The centering or keying element 20 is shown to pass through locking plates 9 and 18 into keyed relationship with plate 7 by passing the end 23 of keying element 20 through the opening 24 of plate 7.

Referring now to FIG. 4 which is the outer locking plate 7 having disposed thereon indexing numerals 22, there is illustrated the plate 7 and shaft 27 and the annular element 26 containing it. The drawing further illustrates a section of keying member 20 as it would be when the spaced relationship between the knives of plate 17 and plate 9 are in the index position indicated by the numeral 8. It will be noted that there is a 22½ degree relation between the knives 10 and the knives 30.

Figure 5:
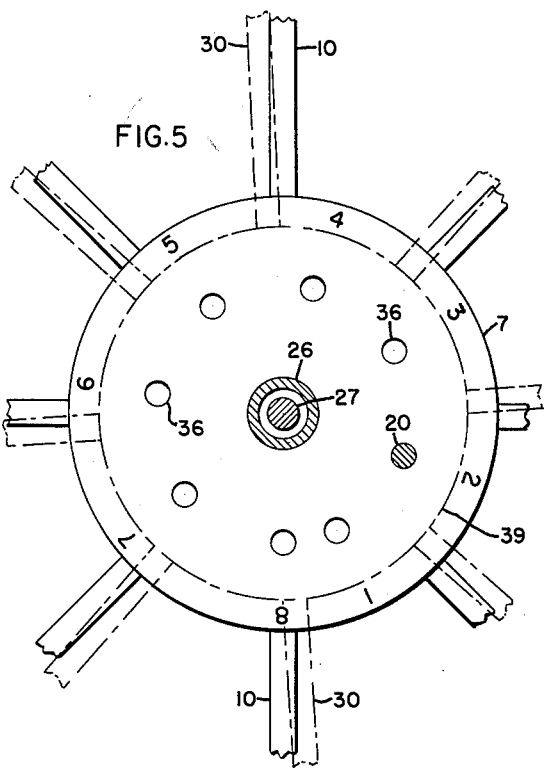
FIG. 5 is a second view, similar to FIG. 4, showing the index pin at a different index position.

FIG. 5 is an illustration similar to FIG. 4 indicative of the arrangement of knives 10 and 30 when the index position 2 has been set. In FIGS. 4 and 5 reference character 36 is directed to other indexing openings similar to 24 of FIG. 3.

Figure 6:
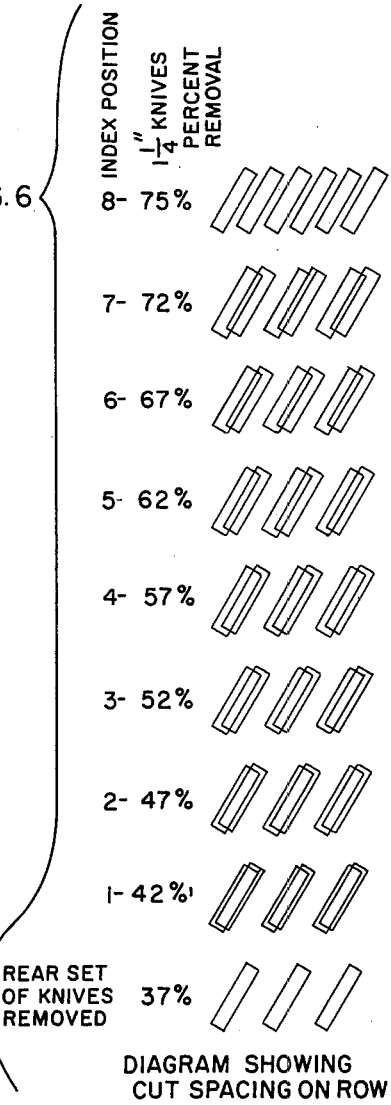
FIG. 6 is a table illustrating the pattern diagram which may be accomplished by the several adjustments of the instant invention.

FIG. 6 is a chart or table showing the different cut patterns it is possible to accomplish, including slight overlapping or swath, with the apparatus of the instant invention. It will be noted, for example, that setting the keying member 20 next to the indexing number 8, a pattern resulting in a 75% removal of the plants in the rows is accomplished. Alternatively, a setting of the keying member 20 opposite the indexing digit 2, as shown in FIG. 5, results in a 47% reduction in the number of plants found in the rows to be thinned.

Obviously, many modifications and variations of the present invention are possible in the light of the above teaching and appended drawings. It is, therefore, to be understood that within the scope of the appended claims the invention may be practiced otherwise than as specifically described.

I claim:

1. A cutter assembly for rotary row crop thinning, comprising at least two spaced rotary heads, each head carrying a plurality of knives and adapted to be separately mounted and held in adjustable and cooperative relationship on a common axis, said knives mounted in a substantially radial arrangement relative to the lengthwise axis of rotation such that cutting edges thereof describe a substantially circumferential pattern, at least two planar members movable and in cooperative relationship to each other carried by at least one of the heads, a series of openings in each said planar member spaced in a coded relationship, said coded relationship being indicative of a predetermined but not uniform cutting relationship, said openings being differentially spaced, and keying means, said keying means adapted to coact with said openings to align said planar members according to the predetermined code by insertion through the said openings in said planar members.

2. In a cutter assembly for rotary row crop thinning, comprising at least two spaced heads adapted to be separately mounted and held in adjustable and cooperative relationship on a common axis, each head carrying a plurality of knives, said knives extending in a substantially radial arrangement relative to the lengthwise axis of rotation such that the cutting edges thereof describe a substantially circumferential pattern, at least two planar members in movable and cooperative relationship relative to each other carried by at least one of the multiple knife carrying heads, a series of openings in each said planar member, said openings spaced in a uniform coded relationship, indicia for said coded relationship being located on one head to provide visible information as to the cutting edge relationship, said relationship being indicative of a predetermined but not uniform knife arrangement, keying means, said keying means adapted to pass through openings in respective planar members to lock said members against differential movement, said opening spaced in a circumferential pattern.

3. The apparatus of claim 2 in which the heads are related for conjoint motion by a common power source.

4. A cutter assembly for rotary row crop thinning, comprising at least two rotary heads adapted to be mounted and held in spaced relationship on a common axis, each head carrying a plurality of knives radiating with respect to the axis of rotation such that the cutting edges of said knives describe a substantially circumferential pattern during rotation, one of said heads including at least two planar members, one of which members is rotatable with respect to the other, a series of openings in each of said planar members, the openings in one planar member being spaced in a coded relationship to openings in the other planar member for selective positioning of said members, said coded relationship being indicative of a predetermined but not uniform cutting edge spacing, keying means for said openings adapted to align said planar members in selected positions according to the predetermined code, and indicia for designation of the various coded relationships.

5. The apparatus of claim 4 in which the indicia are unequally spaced visible markings on one of the planar members, said unequal spacing being indicative of the various coded relationships.

6. A cutter assembly for rotary row crop thinning, comprising at least two rotary heads adapted to be mounted and held in spaced adjustable and cooperative relationship on a common axis, each head carrying a plurality of knives radiating with respect to the axis of rotation such that the cutting edges of said knives describe a substantially circumferential pattern during rotation, one of said heads including at least two planar members, one of which is rotatable with respect to the other, a series of indicia on one of said planar members, said indicia spaced in a coded relationship to indicia on the other planar member, said coded relationship being indicative of a predetermined but not uniform cutting edge spacing, keying means, said keying means adapted to coact with and align said planar members according to the predetermined code.

7. An agricultural apparatus for thinning growing row crop plants, comprising a wheel-supported member, an inner and an outer rotary head mounted on said member in spaced relationship along a lengthwise axis of rotation, each of said heads carrying a plurality of knives in radiating relationship to said lengthwise axis of rotation, said outer head including at least two planar members, one of which is movable with respect to the other to vary the spacing of the knives of the outer head with respect to the knives of the inner head according to a predetermined but not uniform cutting sequence, visible indicia on said outer head indicative of said cutting sequence, and means to lock said heads in the selected position for conjoint rotation by a common power source.

8. A cutter assembly for rotary row crop thinning, comprising at least two spaced rotary heads, each carrying a pluraltiy of knives and adapted to be separately mounted and held in cooperative relationship on the assembly, said knives being mounted in a generally radial arrangement relative to the lengthwise axis of rotation of the respective heads such that the cutting edges thereof describe a substantially circumferential pattern, at least two members arranged in movable cooperative relationship to each other and carried by at least one of the heads, a series of aligning means associated with said members and spaced in a coded relationship indicative of a predetermined but not uniform cutting relationship, and keying means adapted to coact with said aligning means to align the members with which they are associated according to a selected code.

9. A cutter assembly for a rotary row crop thinning, comprising at least two spaced rotary heads, each carrying a plurality of knives and adapted to be separately mounted and held in adjustable and cooperative relationship along a substantially common axis on the assembly, said knives being mounted in a generally radial arrangement relative to the lengthwise axis of rotation such that the cutting edges thereof described a substantially circumferential pattern, at least two members arranged in movable and cooperative relationship to each other and carried by at least one of the heads, a series of aligning means associated with said members and spaced in a coded relationship indicative of a predetermined but not uniform cutting relationship, said aligning means being differently spaced, and keying means adapted to coact with said aligning means to align the members with which they are associated according to a selected code.

10. A cutter assembly for rotary row crop thinning, comprising at least two spaced rotary heads, each carrying a plurality of knives and adapted to be separately mounted and held in adjustable and cooperative relationship along a substantially common axis on the assembly, said knives being mounted in a generally radial arrangement relative to the lengthwise axis of rotation, such that the cutting edges thereof describe a substantially circumferential pattern, at least two planar members arranged in movable and cooperative relationship to each other and carried by at least one of the heads, a series of aligning means associated with each said planar member and spaced in a coded relationship indicative of a predetermined but not uniform cutting relationship, said aligning means being differently spaced, and keying means adapted to coact with said aligning means to align the planer members with which they are associated according to a selected code.

References Cited in the file of this patent

UNITED STATES PATENTS

| | | |
|---|---|---|
| 954,149 | Thomas | Apr. 5, 1910 |
| 1,322,447 | Irwin et al. | Nov. 18, 1919 |
| 2,551,313 | Brinson | May 1, 1951 |
| 2,604,026 | Latta | July 22, 1952 |

FOREIGN PATENTS

| | | |
|---|---|---|
| 1,140,658 | France | Mar. 4, 1957 |